No. 658,338. Patented Sept. 25, 1900.
J. N. BYERS.
VEHICLE WHEEL.
(Application filed Aug. 7, 1899.)
(No Model.) 2 Sheets—Sheet 1.
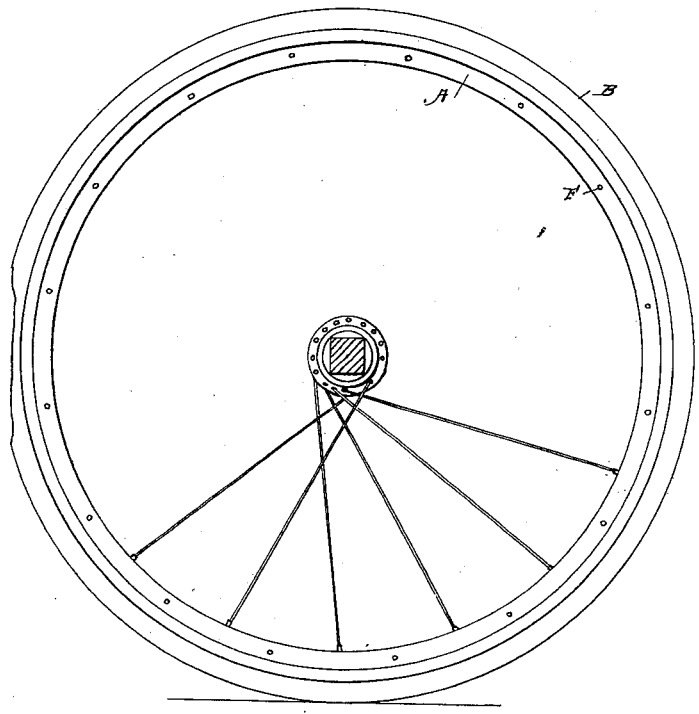
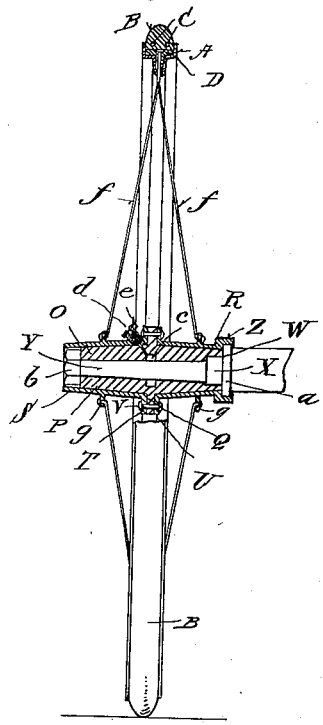
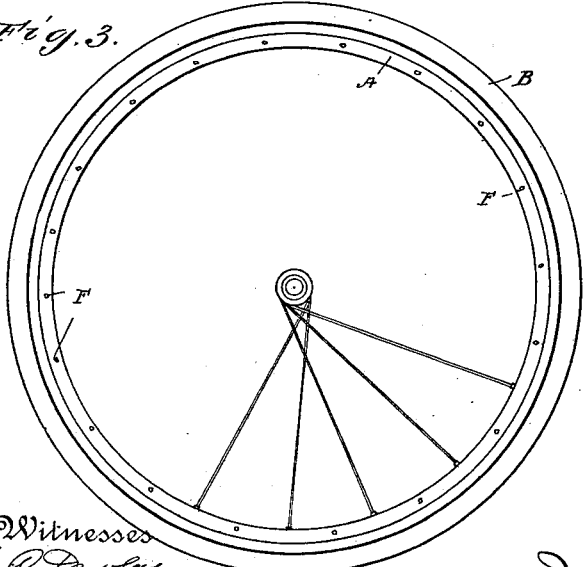
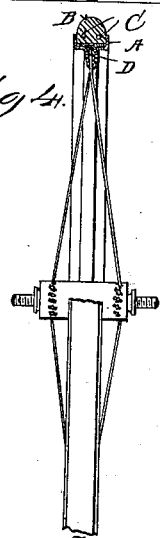
Witnesses
J. A. Dawley.
W. M. McNair.
Inventor
Joseph N. Byers,
By his Attorney No. 658,338. Patented Sept. 25, 1900.
J. N. BYERS.
VEHICLE WHEEL.
(Application filed Aug. 7, 1899.)
(No Model.) 2 Sheets—Sheet 2.
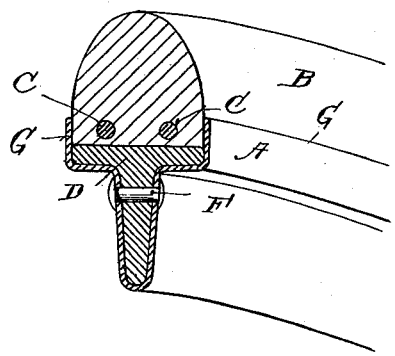
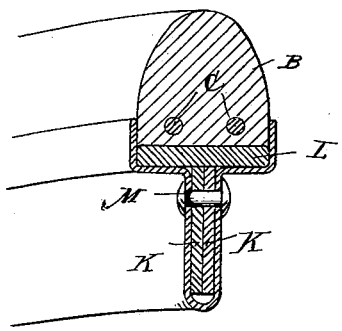
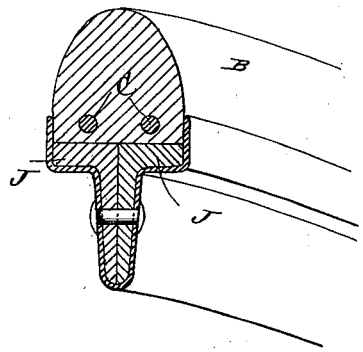
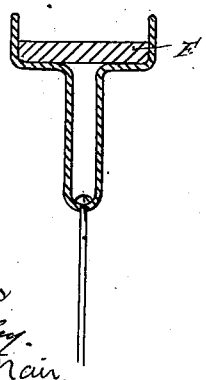
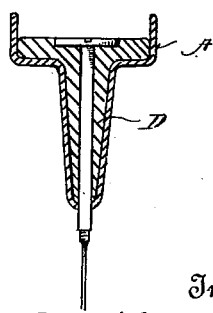

UNITED STATES PATENT OFFICE.

JOSEPH N. BYERS, OF URBANA, OHIO.

VEHICLE-WHEEL.

SPECIFICATION forming part of Letters Patent No. 658,338, dated September 25, 1900.

Application filed August 7, 1899. Serial No. 726,391. (No model.)

*To all whom it may concern:*

Be it known that I, JOSEPH N. BYERS, a citizen of the United States, residing at Urbana, in the county of Champaign and State of Ohio, have invented certain new and useful Improvements in Vehicle-Wheels, of which the following is a specification, reference being had therein to the accompanying drawings.

This invention relates to certain new and useful improvements in vehicle-wheels.

The general objects of this invention have reference, first, to an improved felly construction by which a rubber tire, such as commonly employed, may be held from moving laterally, such holding means being brought into holding position after the rubber tire is in place; second, to an improved stiffening arrangement for the felly, which also acts to support a rubber tire, and, third, an improved hub construction whereby the hub may be cast in parts and be composed of a pair of outer sleeves and an interior hub and means for securing said sleeves together.

My invention also relates to details of construction and arrangement hereinafter appearing and particularly pointed out in the claims.

In the accompanying drawings, on which like reference-letters indicate corresponding parts, Figure 1 is a side view of my improved wheel with a portion of the spokes removed; Fig. 2, an edge view of the same with parts in section; Fig. 3, a similar view to Fig. 1, but showing the opposite side of the wheel; Fig. 4, a similar view to Fig. 2 and showing the hub complete; Fig. 5, a sectional view of the rubber tire, showing my improved felly construction, also in section, with the stiffening-piece in the form of a T; Fig. 6, a similar view to Fig. 5, but showing another form of stiffening device; Fig. 7, another similar view to Fig. 5 and also showing still another form of stiffening device; Fig. 8, a sectional view of the tire-holder forming the felly, showing another form of stiffening device; and Fig. 9 a similar view to Fig. 5, showing one manner of connecting the spokes to the felly.

I will first describe the preferred form of my invention as illustrated in Figs. 1 to 5 and 9.

The letter A represents an improved holder for retaining a rubber tire, such as shown at B, against lateral displacement, it being understood that such tire is held in place circumferentially by means of retaining-wires C in the form of annular bands or in any other suitable manner. The holding device preferably constitutes the felly of the wheel, within which is placed a stiffening-piece D, such stiffening-piece constituting a seat for the rubber tire B. In some cases the stiffening-piece extends downward within the holding device, as exhibited in Figs. 2 and 4 to 9, inclusive, while in other instances it is in the form of a plain band, as shown in Fig. 8 at E. In order that the stiffening device and the holding device may be united, I provide rivets F, which are arranged at intervals around the felly. The upper portion of the holding device, as shown at G, is intended to project out straight from the stiffening-piece D, so that the rubber tire may be readily placed upon the stiffening-piece, where it is firmly secured by means of the bands C, above described, or in any other suitable manner. After the tire is in position the portions G are turned over against the rubber by passing it through a suitable machine for this purpose. In this manner the rubber tire is held firmly in position laterally, while the rubber bands hold it in position circumferentially.

In some instances it may be found advantageous to form the stiffening-piece of two portions, as shown at J in Fig. 7, while in other instances it may be desirable to construct such stiffening-piece of three portions, as shown at K and L in Fig. 6. In Fig. 6 a similar holding device to that shown in Fig. 5 is employed, while the band L is similar to the stiffening device shown in Fig. 8; but beneath such stiffening-band a pair of annular plates, as shown at K, are placed, such plates being firmly held together by means of rivets M or in any other suitable manner. As exhibited in Fig. 8, I have employed a similar holding device, which constitutes a felly, and have employed the stiffening-band. This construction may be employed for lighter vehicles, such as wagons for children, tricycles, &c. In some instances the spokes of the wheel may be attached direct to the holding device or extend into the stiffening member, as desired.

Referring now to my improved hub construction, the letter O represents an interior hub, which preferably decreases in size from substantially midway its length toward its outer ends, as shown at P. Preferably an annular flange Q extends about the hub O, as illustrated in Fig. 2. Over this hub fit sleeves R and S, respectively, such sleeves also having annular flanges, as shown at T and U, the latter of which fit against the annular flange Q and are secured thereto by means of rivets V or in any other suitable manner. It will be observed that the hub O is bored out, as shown at W, to receive a shoulder X on the axle Y, while the outer sleeve R is enlarged at its outer end, as shown at Z, to receive a shoulder $a$, also projecting from the axle Y. The outer end of the hub O does not extend to the outer end of the hub-sleeve S, so that the nut B may be screwed onto the axle and be protected by such casing. In order to oil the axle, I provide an annular receptacle $c$ within the hub O, to which is connected an oil-passage $d$. Thus when it becomes necessary to oil the wheel all that is necessary to do is to remove the screw-plug $e$ or other suitable device from the passage $d$, when the oil may readily be inserted.

My invention may be manufactured cheaply, yet at the same time possesses great strength and durability.

It will be observed that the spokes $f$ are connected to flanges $g$, extending about the respective hub-casings R and S; but this is an old arrangement and I do not wish to lay any claim thereto.

Having thus fully described my invention, what I claim as new, and desire to secure by Letters Patent, is—

1. The combination with a vehicle-wheel, of a holding device forming the felly thereof consisting of a metal strip bent along a central line over on itself and forming a recess between such bent-over portions or sides, said sides being bent outward and upward near their outer edges, a stiffening device adapted to fit upon said bent-outward portions and between said bent-upward portions, all substantially as shown and described.

2. The combination with a vehicle-wheel, of a holding device consisting of an annular strip of metal bent along a central line over on itself, said bent-over portions constituting sides having a space between them, said sides extending outward in a substantially-horizontal plane and upward in a vertical plane, a stiffening device adapted to rest on said horizontal portions of said sides and extend within the pocket or recess between said sides, the outer extensions of said sides projecting beyond said stiffening device, substantially as shown and described.

3. The combination with a vehicle-wheel, of an inner hub having an internal annular groove or receptacle therein with an oil-passage leading into said groove and an external annular flange, of a pair of sleeves each having an annular flange adapted to fit upon said inner hub and against the hub-flange, and means for connecting the spokes of the wheel to said hub-sleeves midway their length, substantially as shown and described.

4. In a vehicle-wheel, a holding device constituting a felly, one or more stiffening devices consisting of a piece of metal having a flanged portion and a radially-extending portion adapted to fit within said holding device and below the outer periphery of said holding device, substantially as shown and described.

5. In a vehicle-wheel, a holding device constituting a felly, a pair of stiffening devices formed of angle-iron adapted to fit within said holding device and below its outer periphery, two of the corresponding sides of said angle-irons fitting back to back and the other two corresponding sides extending in the opposite direction from each other at substantially right angles to the radii of the wheel, and means to extend in through the inner portion of said holding device and also through said matching portions of said angle-irons, said angle-irons, constituting said stiffening feature and also acting to form a seat for an elastic tire, all substantially as shown and described.

In testimony whereof I affix my signature in presence of two witnesses.

JOSEPH N. BYERS.

Witnesses:
B. B. ESTERLINE,
W. M. McNAIR.